(No Model.) 2 Sheets—Sheet 2.
J. T. LEIGHTON.
HARROW AND CLOD CRUSHER.
No. 378,012. Patented Feb. 14, 1888.
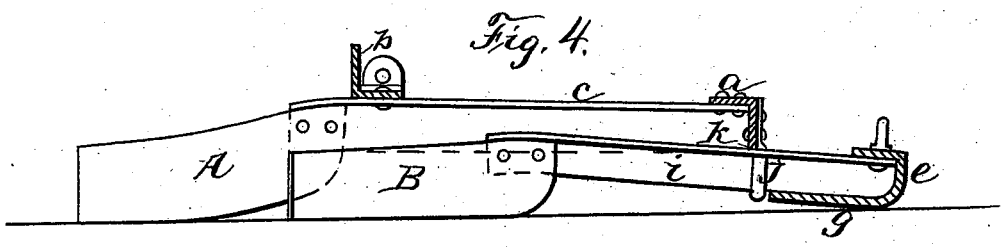
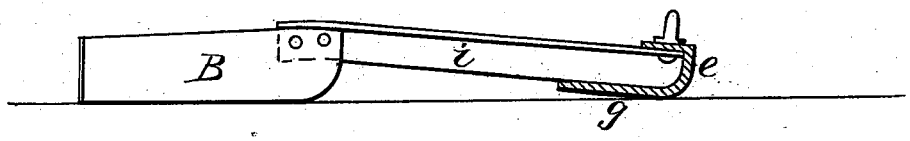
Witnesses
Ella S. Johnson,
E. W. B. Phillips.
Inventor
James T. Leighton
By his Attorneys
Johnson and Johnson

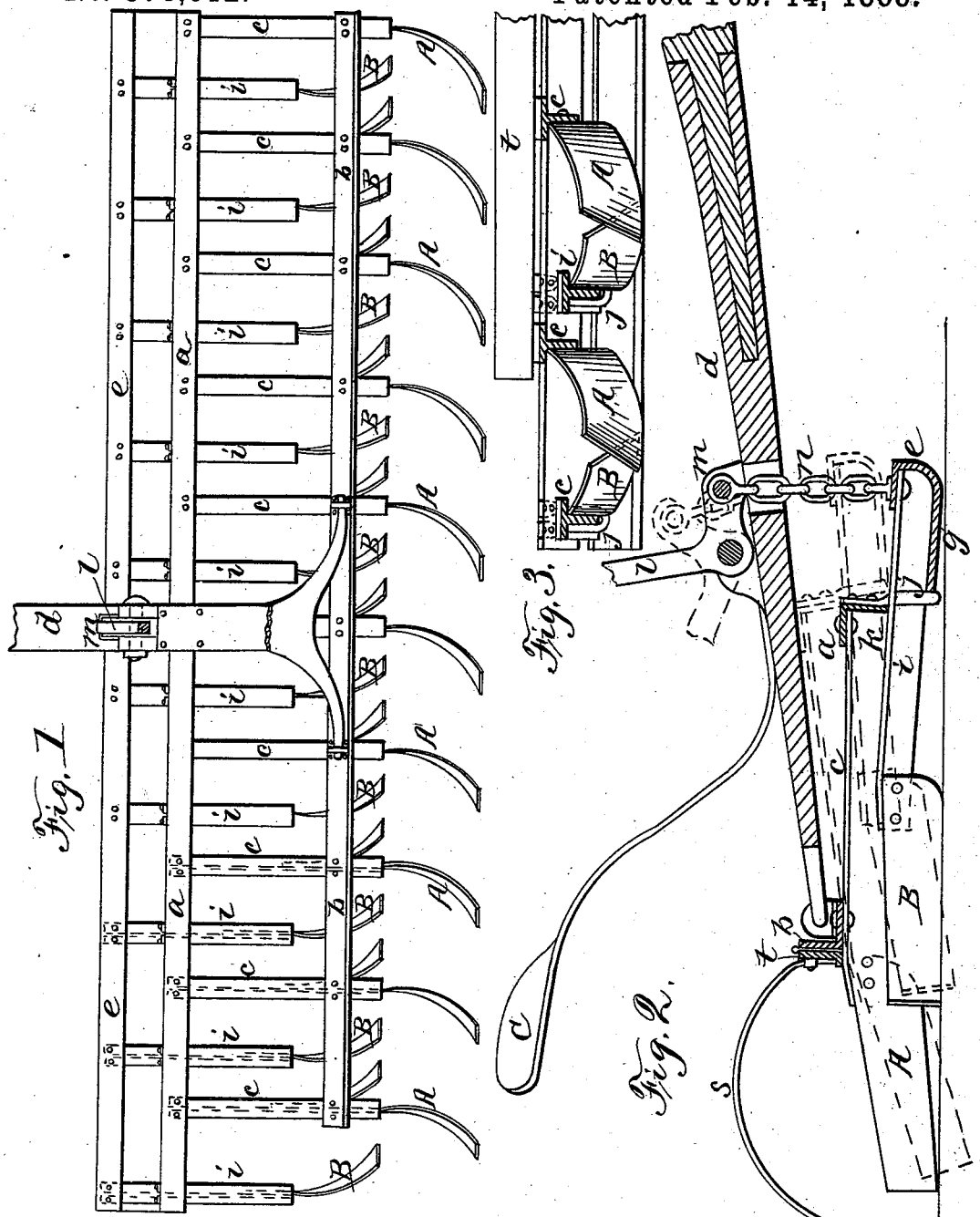

UNITED STATES PATENT OFFICE.

JAMES T. LEIGHTON, OF NEW HAVEN, CONNECTICUT.

HARROW AND CLOD-CRUSHER.

SPECIFICATION forming part of Letters Patent No. 378,012, dated February 14, 1888.

Application filed July 7, 1887. Serial No. 243,680. (No model.)

*To all whom it may concern:*

Be it known that I, JAMES T. LEIGHTON, a citizen of the United States, residing at New Haven, in the county of New Haven and State of Connecticut, have invented new and useful Improvements in Harrows and Clod-Crushers, of which the following is a specification.

I have produced an improved agricultural machine, which, by being dragged over the surface of the ground, will at a single operation level the ground and crush the clods and harrow and pulverize the soil to prepare it for the reception of the seed, or to cultivate it and turn the seed under the soil when scattered broadcast.

In the construction and organization of the machine I use two sets or gangs of dragging or trailing cultivator-blades—one set carried by a rigid frame composed of two transverse bars connected by tie-bars, the other set carried by independent drag-bars secured to a front shoe-bar suspended from the front bar of the rigid frame, and having an adjustable connection with a tongue hinged to the rear transverse bar of the rigid frame. The trailing cultivator-blades are secured to and carried by the rear ends of the tie and drag bars—one set in advance of the other—and they stand in opposite lateral curved relation to each other, so as to give an unbroken action upon the ground and a central draft to the machine. The tie-bars of the frame and the drag-bars of the shoe extend in front of the hinged connection of the tongue, and are free to rise and fall together at their front ends, so that while the crushing and leveling shoe-bar is free to ride by its weight upon the ground it is also constantly pressed down upon the ground by the draft of the tongue exerted from a point considerably in rear of and above the shoe-bar and rigid frame. The shoe-bar extends in front of the rigid frame, and is suspended beneath the latter by loop-hangers in such manner that the lower edge of the front bar of such frame serves as a fulcrum, upon which, in raising the shoe-bar, the trailing blades carried by its drag-bars are caused to drop down and enter deeper into the ground. While the lower drag-bars are thus suspended from the front bar of the rigid frame, the suspending loops and the bottom plate of the shoe-bar cooperate to hold the shoe-bar in advance of the rigid frame, so that the latter supports the shoe-bar against its rearward thrusting action, while the machine is dragged along from a hinge-connection vertically over the trailing blades in a manner to keep the latter down to their work.

A rake composed of curved springs, like a horse hay-rake, may be used as an auxiliary smoother, and when used it is hinged to the rear gang-bar, so as to extend over and in rear of the trailing blades, and is adapted to be turned up out of use over upon the hinged end of the tongue. By this construction a single machine of comparatively light construction may have in use four separate and distinct earth-treating devices—a crushing shoe-bar, two separate and distinct series of cutting and smoothing blades, and a rake of spring-fingers—each such device acting in succession from the front to the rear of the machine, and thus acting upon the soil in a most efficient manner.

When the machine is used for turning in or covering seed sown broadcast, the shoe-bar is raised out of use, and in such operation the rake will be found advantageous in more completely covering the seed.

The particular matters which constitute my improvement and the details and operation of which will be fully set forth hereinafter and made the subject of specific claim.

Referring to the drawings, Figure 1 is a top view, Fig. 2 is a vertical section, and Fig. 3 is a partial rear elevation, of my improved machine. Fig. 4 shows in section the rigid frame and the drag-bars, and Fig. 5 shows the shoe and its drag-bar.

The frame of the machine consists of a front gang-bar, $a$, a rear gang-bar, $b$, and a number of tie-bars, $c$, standing in the line of draft and projecting in rear of the rear gang-bar, connecting and bracing the gang-bars from end to end, forming a rigid frame to the rear gang-bar, of which at the middle of its length the tongue $d$ is hinged, so that the front gang-bar and its tie-bars extend under the tongue, which is supported upon the horses' necks. These tie-bars have the trailing cultivator-blades A secured to their rear ends, so as to stand one in advance of the other in opposite lateral curved relation thereto and to each other, and have a lapping scraping action upon the ground at their rear curved ends.

A shoe-beam, e, is supported by and in front of the front gang-bar of the rigid frame, so as to ride upon the ground and crush clods and level the unevenly-plowed surface in advance of the cultivating-blades. It is formed of angle-iron, having a front rounded nose, f, a flat bottom part, g, and a top flange or ledge part, h, standing back from the front. Its length is equal to that of the front bar of the rigid frame, and it is carried by a series of drag-bars, i, which extend back beneath the rigid frame and carry at their rear ends trailing cultivator-blades B, which work under the rear gang-bar of the rigid frame. This device, consisting of the shoe-beam, its drag-bars, and their trailing blades, is suspended from the front gang-bar by yokes j, which straddle each drag-bar, and riveted to the front gang-bar, as seen in Fig. 2, so that each drag-bar is held in fixed relation vertically to the front gang-bar by and between the lower edge, k, of the latter and the bottom of each loop-hanger, whereby the raising and lowering of the shoe-beam also raises and lowers the front drag-bar of the rigid frame.

The raising of the shoe-beam produces another result, and that is, it depresses in proportion the rear ends of the drag-bars and their connected trailing blades into the ground; and in this adjustment the lower edge, k, of the front gang-bar serves as the fulcrum-point for such rocking movement of the drag-bars and holds their blades to their work.

The means for effecting this adjustment consists of bell-crank lever l, pivoted upon the tongue vertically over the shoe-beam in front of the rigid frame, and having its crank end m connected to the top flange of the shoe-beam by chain or link connection n, so that the shoe-beam and the front part of the rigid frame are free to have a vertical movement beneath and independent of the tongue. The handle of this lever extends within convenient reach of the driver and is held down to raise the shoe-beam by his foot or any well-known means which may be provided for the purpose.

A seat, C, for the driver is supported upon the tongue in position to bring his weight a little in the rear of the rear gang-bar over the cultivating devices, so that his weight exerts no direct pressure upon the front crushing-beam; but as a compensation for this the draft of the tongue is caused to pull the front part of the rigid frame and the shoe-bar carried thereby constantly down upon the ground, and to maintain thereby a considerable pressure upon the shoe-beam.

As the rigid frame stands beneath the tongue and the latter has a hinge-connection with the rear gang-bar, the shoe-beam is free to rise and fall between the ground and the tongue when the lever is raised in vertical position, and when the lever is depressed the shoe-beam is raised from the ground.

The gang-bars and their tie-bars I prefer to make of angle-iron, and to rivet them together to obtain strength, stiffness, and cheapness of construction. The tie-bars are of T shape in cross-section, so that the vertical web part gives a convenient riveting-surface on two sides for the curved trailing blades and affords an effective support for them in their function of smoothing and leveling the ground.

The gang-bars are L-shaped in cross section, and are riveted to the top flanges of the tie-bars. The rear gang-bar has its web standing upward, and the front gang-bar has its web standing upward, and both these webs serve a purpose shown in the drawings. The drag-bars are also T-shaped in cross section, and are fitted within the shoe-beam and riveted by their top flanges to its top flange or ledge, while the loop-hangers, abutting against the rear edge of the bottom of the shoe and embracing the bars, serve to brace them against lateral strain and to support the shoe-beam against rearward movement. The hangers, in fact, form an abutment for the shoe-beam, while at the same time they serve to suspend the drag-bars and to connect them to the front of the rigid frame.

The earth-treating devices are preferably spring blades or teeth r, and are arranged in series of two gangs. The one series composing a gang is arranged in advance of and curves laterally in an opposite direction to the series of the rear gang, thereby covering the entire space equal to the length of the leveler. These blades or shares have their straight flat parts riveted to the opposite sides of the vertical web part of the tie bars and curve laterally in separate rows, one row extending beyond the rear end of the tie-bar, and the other row extends outward from one side under the gang-bar, each blade terminating in a flat or horizontal twist, so as to slightly turn the soil as it leaves it.

The lower or cutting edge of each blade may be straight or curved like a rocker, and cuts into the ground, so that each blade has a cutting and a smoothing action.

The tie-bars, as shown, may carry a single or double row of blades, while the drag-bars carry a single riveted row extending beneath the rear gang-bar, and for this purpose the drag-bars do not extend to the rear gang-bar.

This construction gives the advantage of riveting the blades to the transverse frame-bars and dispenses with screw bolts and nuts, gives firm flat seats to the blades upon the angle-iron, and avoids the necessity of bending the fastening ends of the seats.

When the rake is used, as shown, it is hinged to the web of the rear gang-bar, so that its curved spring teeth or fingers s hang over the rear cultivating-blades and drag upon the ground to assist in the smoothing and leveling operation.

The rake-fingers are secured to a back bar, t, which is hinged to the upper edge of the web of the rear gang-bar, so as to rest against said web and support the fingers about on a level with the cutting-edges of the blades. The rake can be turned up out of use over upon the tongue and fastened thereto in any suitable way, and it may be so hinged as to be readily removed.

While the rigid frame tends by gravity to keep the front shoe-beam upon the ground, the draft of the tongue tends also by a downward impulse to press it down to more effective work.

What I claim as my invention is—

1. The combination, substantially as hereinbefore set forth, of the rigid frame having the trailing cultivating devices, the tongue hinged to the rear part of said frame, and the leveler or clod-crusher having drag-bars carrying trailing cultivating devices and confining and bracing hangers for each drag-bar, secured to the front part of said frame and forming an abutment for said leveler, whereby the latter is free to rise and fall independently of the tongue.

2. The combination, substantially as set forth, of the rigid frame with its trailing cultivating devices, the tongue hinged to the rear part thereof, the leveler or clod-crusher having the drag-bars provided with the trailing cultivating devices, the hangers for said drag-bars, and means for raising the leveler.

3. The combination of the crusher-bar having drag-bars provided with trailing cultivating devices, a rigid frame having trailing cultivating devices, separate depending hangers for each separate drag-bar, and a downward-projecting fulcrum-bearing for the gang of drag-bars, means for raising the crusher-bar against said fulcrum-bearing, and a tongue hinged to the rigid frame in rear of said hangers, substantially as set forth.

4. The combination, substantially as set forth, of a tongue, a rigid frame to the rear part whereof the tongue is hinged, a crusher-bar suspended from the front of said frame, trailing cultivating devices for said frame and crusher-bar, a seat for the driver, overhanging the cultivating devices, and a lever pivoted upon the tongue, having a free connection with said crusher-bar in advance of the rigid frame.

5. The combination of the crusher-bar, the rigid frame arranged over the latter and having suspending hangers therefor arranged between the front of said frame and the crusher-bar, the tongue hinged to said frame in rear of said hangers, and trailing cultivating devices carried by said frame and crusher-bar, substantially as set forth.

6. The combination, substantially as hereinbefore set forth, of a front crusher-bar, a rigid frame, a tongue hinged thereto in rear of the crusher-bar, trailing cultivating devices carried by said frame and bar, and a rake carried by said frame in rear of the cultivating devices.

7. The combination, substantially as hereinbefore set forth, of the rigid frame, a tongue hinged to the rear thereof, a crusher-bar suspended to the front of said frame, trailing cultivating devices carried by the frame and the crusher, a rake hinged to said frame in rear of the hinged connection of said tongue, and a seat overhanging said cultivating devices, carried by the tongue and having a free connection with the crusher-bar in front of its point of suspension.

8. The combination, substantially as hereinbefore set forth, of a rigid frame, a crusher-bar having a fixed point of suspension at the front side of said frame, trailing cultivating devices carried by said frame and crusher-bar, a tongue hinged to said frame in rear of said suspension-point, and a lever carried by said tongue, connected to the front end of said crusher-bar, whereby the latter is raised and its trailing devices depressed.

JAMES T. LEIGHTON.

Witnesses:
HENRY ROGERS,
JOHN H. WHITING.